US007287942B1

(12) United States Patent
Valkenburgh

(10) Patent No.: US 7,287,942 B1
(45) Date of Patent: Oct. 30, 2007

(54) MOTORCYCLE RESTRAINT SYSTEM

(75) Inventor: Charles Van Valkenburgh, Huntsville, AL (US)

(73) Assignee: Pit Bull Products, Inc., Huntsville, AL (US)

( * ) Notice: Subject to any disclaimer, the term of this patent is extended or adjusted under 35 U.S.C. 154(b) by 0 days.

(21) Appl. No.: 11/748,065

(22) Filed: May 14, 2007

Related U.S. Application Data

(63) Continuation of application No. 11/684,662, filed on Mar. 12, 2007.

(51) Int. Cl.
*B60P 7/08* (2006.01)
(52) U.S. Cl. .................... 410/3; 410/7; 410/19; 410/22
(58) Field of Classification Search ............... 410/2, 410/3, 7, 9, 10, 19, 22, 80; 224/924, 403, 224/533, 547, 567; 211/20, 22; 248/500, 248/503
See application file for complete search history.

(56) References Cited

U.S. PATENT DOCUMENTS

| 6,715,972 B2 * | 4/2004 | Jackson, Sr. ................. 410/97 |
| 7,198,443 B2 | 4/2007 | Macomber, III |
| 2006/0163543 A1 | 7/2006 | Kobacker, II et al. |

FOREIGN PATENT DOCUMENTS

JP 58174034 10/1983

* cited by examiner

*Primary Examiner*—Stephen Gordon
(74) *Attorney, Agent, or Firm*—Adam K Sacharoff; Much Shelist

(57) ABSTRACT

The present invention is a motorcycle restraint system utilizing a trailing member linking the rear axle of the motorcycle to the floor of the transport vehicle via two hinge joints, allowing for automatic height adjustment. The restraint system allows the motorcycle to be transported without the use of tension straps, allowing both tires to rest on the floor of the transport vehicle against only the weight of the motorcycle.

7 Claims, 8 Drawing Sheets

MOTORCYCLE RESTRAINT SYSTEM

CROSS REFERENCE TO RELATED APPLICATION

The present application is a continuation of U.S. application Ser. No. 11/684,662 filed Mar. 12, 2007.

FIELD OF THE INVENTION

The present invention relates generally to systems for restraining motorcycles during transport. More particularly, this invention pertains to systems of restraining a motorcycle in a trailer or other vehicle (hereafter collectively referred to as transport vehicle) without the use of straps.

BACKGROUND OF THE INVENTION

There are generally three prior systems of restraining a motorcycle in a transport vehicle, which are described below.

The first system is commonly referred to as the Chock and Strap System. The customary system of restraining a motorcycle involves a chock to prevent forward motion, and straps (usually two or four) that simultaneously pull the motorcycle forward into the chock and downward compressing the motorcycle tires and springs of the front and rear motorcycle suspension. The motorcycle tire pressures and springs of the motorcycle suspension help restrain the motorcycle by providing a relatively constant force on the straps.

The disadvantages of the chock and strap system are: i) the straps are relatively time consuming to install and involve manually holding the motorcycle upright while putting the straps into place; ii) careful routing and placement of the straps are required to prevent damage to motorcycle parts including cosmetic parts as well as safety-related parts such as throttle cables and brake lines; iii) heavy compression of the spring suspension system of the motorcycle puts undo stress on the motorcycle suspension and causes premature wear of suspension parts and/or misalignment of suspension and/or chassis components; iv) reduction of tire pressure (i.e., flat or partially flat tire) during transport reduces strap tension, causing the motorcycle to be restrained less-securely; and v) improper routing of straps (i.e., straps not routed at proper angle to form adequate triangulation) might allow the motorcycle to tip over under adverse road conditions.

The second prior system is commonly referred to as a Locking Chock. This second system of restraining a motorcycle for transport includes a more sophisticated front wheel chock, which cradles the wheel in a way that holds the motorcycle upright and prevents forward and backward motion. The chocks operate with a principal of over-center lock and/or a positive lock. In a static situation (i.e., the transport vehicle is not moving), this system will hold a motorcycle upright with no straps to aid in stability. Two straps are recommended to complete this system in order to: i) prevent tip-over of the mated motorcycle/chock (assuming the chock is not attached to the floor of the transport vehicle); and ii) to prevent the front wheel of the motorcycle from hopping out of the chock due to adverse road conditions. This system is an improvement over the chock and strap system since it is generally easier and quicker to stabilize the motorcycle for transport.

The disadvantages of the locking chock system are: i) straps are required to ensure that the motorcycle stays in place in the event of adverse driving conditions causing additional stress on the motorcycle suspension and increasing the time required to restrain the motorcycle; and ii) reduced tire pressure (i.e., flat or partially flat tire) decreases how securely the motorcycle is held in place during transport.

A third prior system is referred to as the Rear Axle Stand. This third system of restraining a motorcycle for transport is shown in two examples of prior art, one of which is sold by Strapless Stands. The second example was previously developed by the Assignor of the present invention and is referred to as the Trailer Restraint Stand, which has been in use since February 2004. These two examples share the following characteristics: i) they both restrain the motorcycle with a rod inserted through its hollow rear axle; ii) they both are capable of holding a motorcycle upright with the rear tire just above the floor in a static situation; and iii) the framework of these systems are fixed to brackets that are permanently fixed to the floor of the transport vehicle. These systems hold the motorcycle in place with no additional augmentation such as straps for all occasions except rollover of the transport vehicle. The front wheel of the motorcycle is held in place by the weight of the motorcycle. This system puts no undo stress into the suspension or chassis of the motorcycle since tension straps are not used and is not dependent on constant tire pressure for its integrity (i.e., a flat tire will not affect how snugly the motorcycle is held).

Disadvantages of the third system includes: i) the motorcycle generally must first move forward, then backward into its stored location which means there must be additional space in front of the motorcycle before it is secured to the floor; and ii) the framework of these two embodiments are not inherently adaptable to varying heights of the motorcycle wheel so provisions must be made to accommodate an unusually large, or small diameter wheel.

To overcome some or all of the disadvantages outlined herein, an embodiment of the present invention is provided that pertains to a motorcycle restraint system that restrains the motorcycle with a rod inserted through the hollow rear axle of the motorcycle like the third prior system, above. But unlike the existing systems, the present invention has a framework assembly that trails behind the motorcycle. The framework assembly is fixed to the motorcycle axle. The motorcycle is then rolled forward until the framework system is trapped by a receiver assembly fixed to the floor of the transport vehicle. The receiver assembly is then positively locked to the framework assembly. When restrained, the system has a hinge point at the motorcycle rear axle and at the lower aft end of the framework assembly where it is trapped by the receiver assembly. In combination, the two hinge points angle the framework assembly to adjust to varying heights of motorcycle wheels and adjust to a tire that flattens during transport. The size and proportions of the system and its components can be altered to fit various applications. Details of the embodiment of the invention can be varied without varying the concept of the invention.

BRIEF SUMMARY OF THE INVENTION

The present invention is a restraint system for transporting motorcycles on or within a transport vehicle. It is distinguished from the most common motorcycle restraint systems in that it does not require the use of tension straps to restrain the motorcycle. It is also distinguished from other trailer restraint systems in that it allows both tires of the motorcycle to rest on the floor of the transport vehicle under the weight of the motorcycle alone. In one embodiment of the invention a rod is inserted through a portion of a framework assembly of the system and the rear axle of the motorcycle. The framework assembly generally trails behind the motorcycle and is trapped by a receiver assembly that is permanently, or semi-permanently, attached to the floor of the transport vehicle. Positive locking of: i) the motorcycle to the framework assembly, ii) the framework assembly to the receiver assembly, and iii) the receiver assembly to the floor ensures safe transport of the motorcycle. In one embodiment two hinge joints are formed resulting in an automatic, or passive, height adjustment capability to accommodate various wheel diameters and to adapt to the change of the effective wheel diameter due to reduced tire pressure (i.e., a flat or flattening tire). Operating this system involves the following steps: i) attaching the framework assembly to the motorcycle by inserting a rod through arms defined by the framework assembly and through the rear axle of the motorcycle, ii) pushing the motorcycle to a stowed location in the transport vehicle so that a trailing bar of the framework assembly is trapped by the receiver assembly in the floor of the vehicle at which time the receiver assembly captures the trailing bar; and iii) positively securing locking assemblies defined by the receiver assembly to restrain the trailing bar.

In one embodiment of the present invention, there is provided a restraint system for use with a motorcycle in a transport vehicle having a floor, wherein the motorcycle has a rear wheel positioned on a rear axle. The restraint system includes a framework assembly and a receiver assembly. The framework assembly has a rod for insertion through the rear axle of the motorcycle and has ends that are captured by arms, which extend upwardly from a trailing bar. The framework assembly is preferably positioned such that the trailing bar is behind the rear wheel of the motorcycle. The receiver assembly is attached to the floor of the transport vehicle and has at least one locking assembly that mates to the trailing bar of the framework assembly, thereby securing the motorcycle to the floor of the transport vehicle.

In yet still other embodiments, the framework assembly may include (1) a handle that extends outwardly from the trailing bar; (2) locking pins positioned on the ends of the rod that extend past the arms; (3) a pair of openings separately positioned on each arm for storing a strap; (4) arms separately spaced by a predetermined distance to accommodate for the rear wheel of the motorcycle; and (5) a trailing bar that has at least one rotatable guide.

In other embodiments, the receiver assembly may include (1) a base plate attached to the floor of the transport vehicle; (2) a pair of locking assemblies that are positioned and separately secured to the base plate by a predetermined distance apart from each other; (3) a locking assembly that includes a latch positioned between a pair of brackets that defines a lateral opening through the brackets and latch, the lateral opening being positioned for receiving and securing an end of the trailing bar between the brackets and latch, whereby the motorcycle is secured to the floor of the transport vehicle through the framework assembly and receiving assembly; (4) a pin for insertion through holes defined by the latch and pair of brackets that align at least when the trailing bar is positioned in the lateral opening.

Various embodiments of the invention have potential for wide spread applications including restraining and/or transporting vehicles or objects other than motorcycles. Other details and advantages of the present system are apparent in the following description, accompanying drawings and the claims.

Numerous other advantages and features of the invention will become readily apparent from the following detailed description of the invention and the embodiments thereof, from the claims and the accompanying drawings.

BRIEF DESCRIPTION OF THE DRAWINGS

A fuller understanding of the foregoing may be had by reference to the accompanying drawings, wherein.

DETAILED DESCRIPTION OF THE INVENTION

Figure 1:
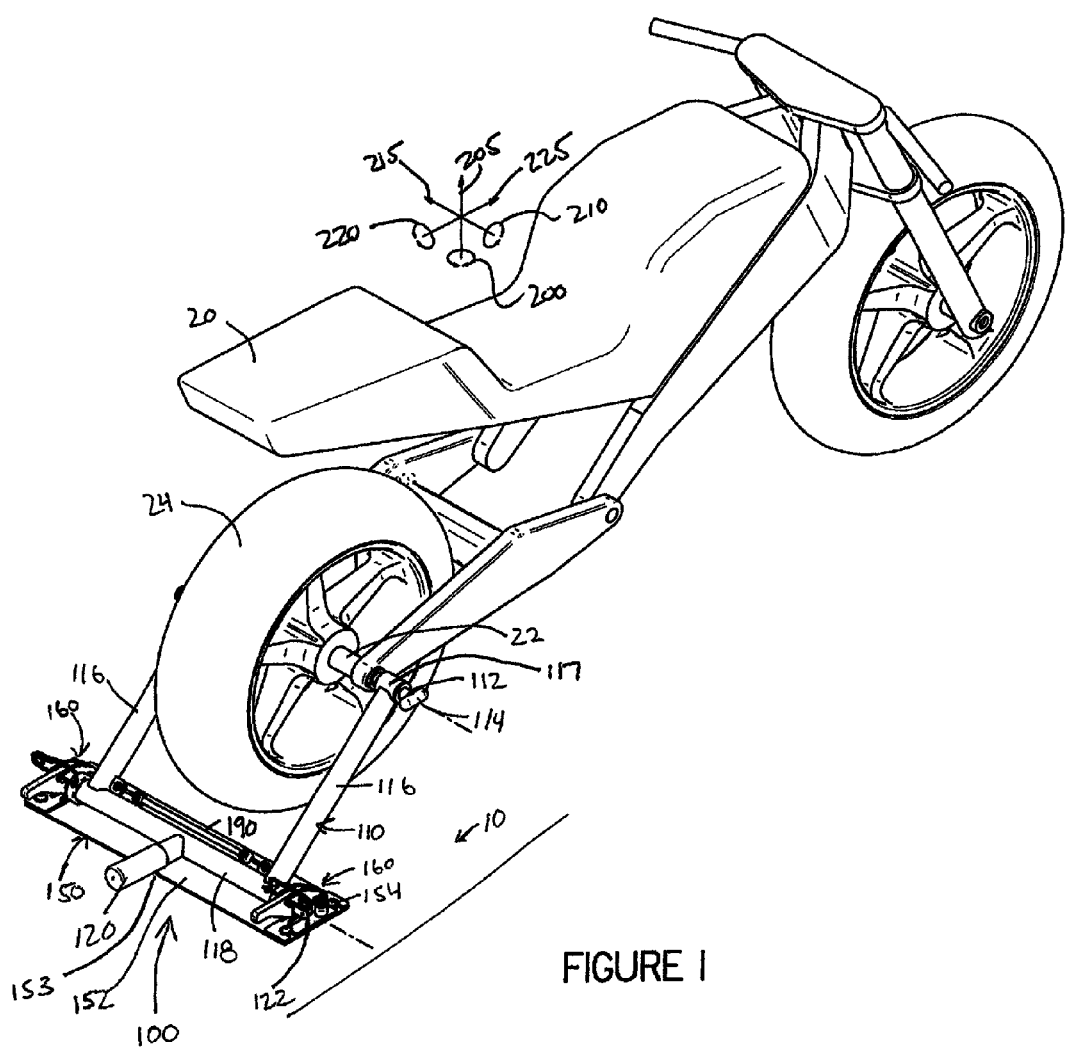
FIG. 1 is an isometric view of an embodiment illustrating the entire system restraining a motorcycle on the floor of a transport vehicle.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Referring to FIGS. 1-4, there is shown a restraint system 100 used for restraining a motorcycle 20 securely and easily to the floor 10 of a transport vehicle (not shown). The restraint system 100 includes a framework assembly 110 removably secured to the motorcycle 20 and removably secured to a receiver assembly 150. The receiver assembly 150 may be either permanently or semi-permanently mounted to the floor 10 of the transport vehicle.

The framework assembly 110 includes a rod 112 that is placed through the rear axle 22 of the motorcycle 20. The rod 112 may include knobs 114 and/or pins that are secured to ends of the rod 112, preventing the rod 112 from sliding out of the rear axle 22 on its own. The knobs 114 may be threaded onto the rod 112 or other securing means may be employed. The framework assembly 110 further includes a pair of arms 116 extending outwardly from a trailing bar 118. The arms 116 may be permanently attached to the trailing bar 118. The ends 117 of each arm 116 have a bore or aperture 119 to accommodate the rod 112. The arms 116 are spaced apart from each other such that the rear wheel 24 of the motorcycle 20 can adequately fit therebetween. As discussed further below, the trailing bar 118 has a predetermined length with ends 122 that extend past the placement of the arms 116.

A handle 120 extends away from the trailing bar 118 at a different direction from the extending arms 116. The placement of the handle 120 along the trailing bar 118, while shown as being approximately in the center of the two arms 116, may be moved without changing the scope of the embodiment. The handle 120 provides various benefits to the framework assembly as described below.

As mentioned above, the framework assembly 110 is removably secured to the receiver assembly 150. The receiver assembly 150 includes a base plate 152 either permanently attached or semi-permanently attached to the floor 10 of the transport vehicle via mushroom bolts 154. On either end of the receiver assembly 150 are locking assemblies 160, which as further described below lock the framework assembly 110 thereto. Each locking assembly 160 includes one or more keyhole slots 162 to accommodate the mushroom bolts 154, which aids in securing the locking assemblies 160 to the floor 10 of the transport vehicle. The base plate 152 will thus serve as a drill template to ensure the locking assemblies 160 are spaced and mounted to the floor 10 of the transport vehicle in correct locations. The base plate 152 may further be stamped or cut with a target mark or notch 153 to guide the user when moving the motorcycle 20 into place. Once the locking assemblies 160 engage the mushroom bolts 154, the receiver assembly 150 is ready to receive the framework assembly 110.

The guides 124 positioned near the ends 122 of the trailing bar 118 prevent y-axis movement when the framework assembly 110 is secured to the receiver assembly 150. When not in use, the receiver assembly 150 can remain attached to the floor of the transport system or be removed if only semi-permanently attached.

Figure 2A:
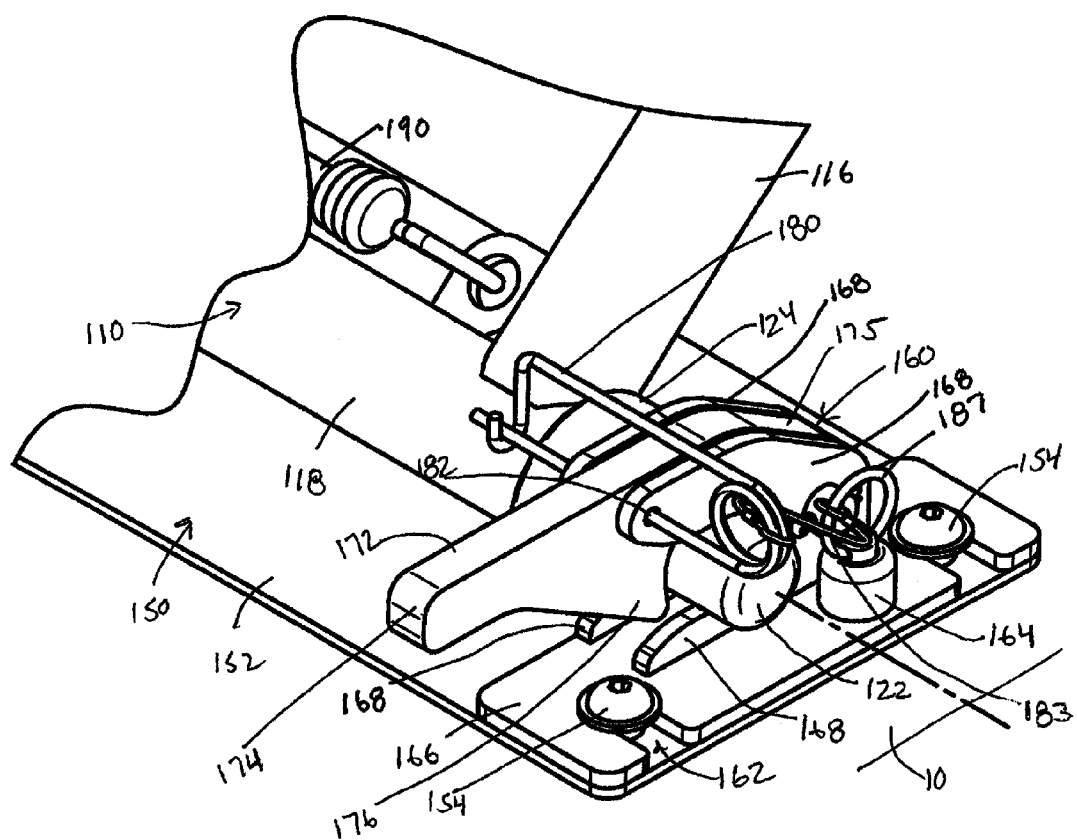
FIG. 2A is an isometric view of the embodiment from FIG. 1 detailing the receiver showing its relation to the floor of the transport vehicle and to the trailing bar.
Figure 2B:
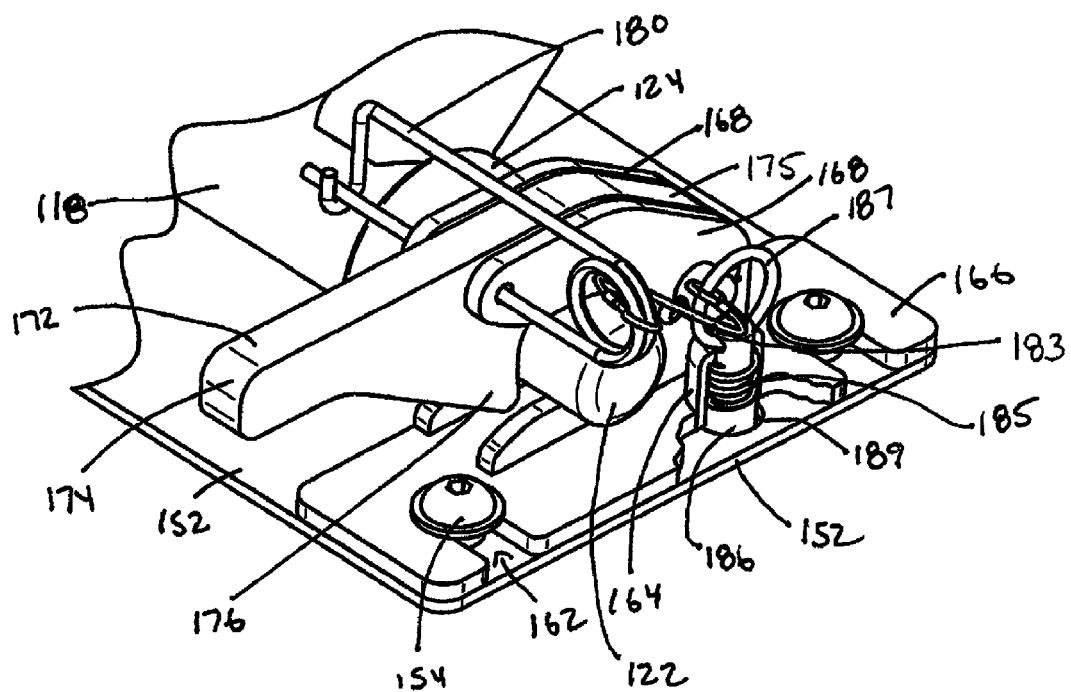
FIG. 2B is an isometric view of FIG. 2A showing a cross section of a lock preventing a locking assembly from moving in the y-axis.
Figure 3:
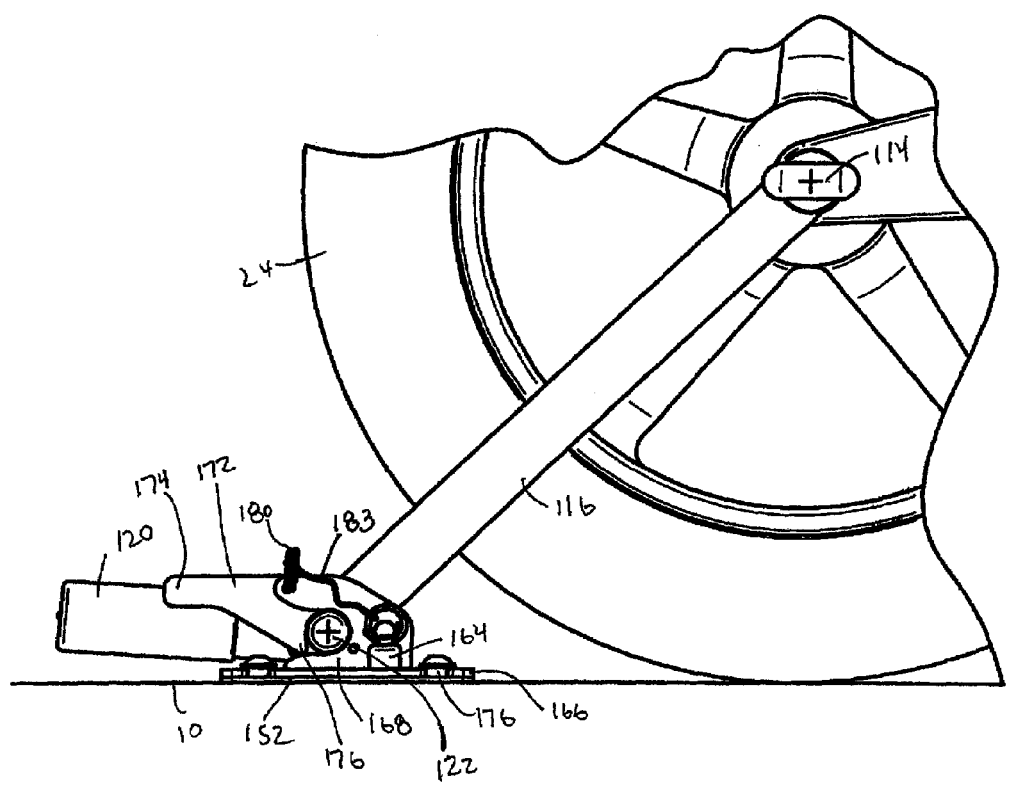
FIG. 3 is side view of the embodiment from FIG. 1.
Figure 4:
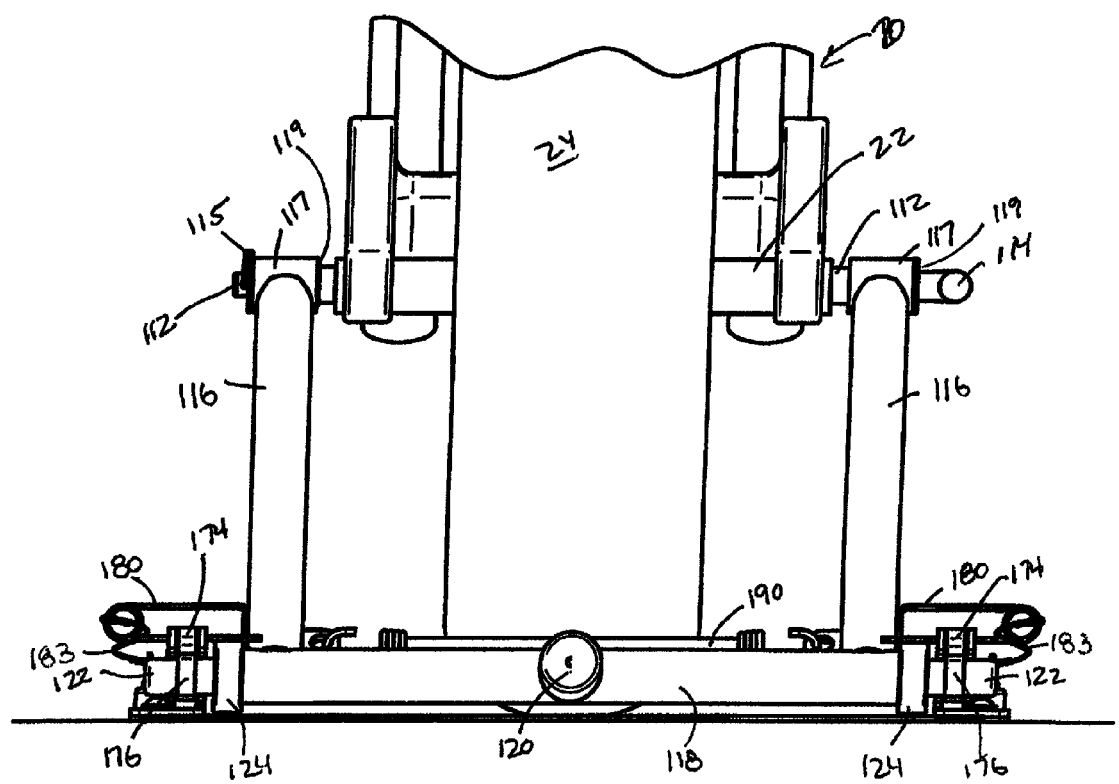
FIG. 4 is a rear view of the embodiment from FIG. 1.

Each locking assembly 160 includes a lower plate 166 that has one or more of the keyhole slots 162 defined therein to secure the mushroom bolts 154. Referring to FIG. 2B, the locking assemblies 160 are further prevented from moving in the y-axis by locks 164, or shear pins. The locks 164 have a spring 185 that forces a lower portion 186 down into an opening 189 in the base plate 152, preventing the lower plate 166 from moving in the y-axis in relation to the base plate 152. To release the lower plate 166, the user grabs and pulls upwardly on a ring 187, which compresses the spring 185 and pulls the lower portion 186 out of the opening 189.

A pair of U-shaped brackets 168 are secured to the lower plate 166 and are arranged such that the openings 170 defined thereby are positioned to receive the ends 122 of the trailing bar 118. Positioned between the two brackets 168 is a latch 172. The latch 172 includes a first end defined as a handle 174. At a second end 175, the latch 172 is pivotally secured between the two brackets 168. The latch 172 also includes a lower protruding member 176 that aligns to close off the opening 170 in the brackets such that the end 122 of the trailing bar 118 fits in the opening 170 between the lower protruding member 176 and the brackets 168. Once the trailing bar 118 is secured in the locking assemblies 160, a pin 180 can be inserted through aligned apertures 182 and 184 in the brackets 168 and the latch 172, respectively (best seen in FIGS. 6 and 7). In addition, a lanyard 183 may be used to restrain the pin 180 with the lock 164.

Figure 5:
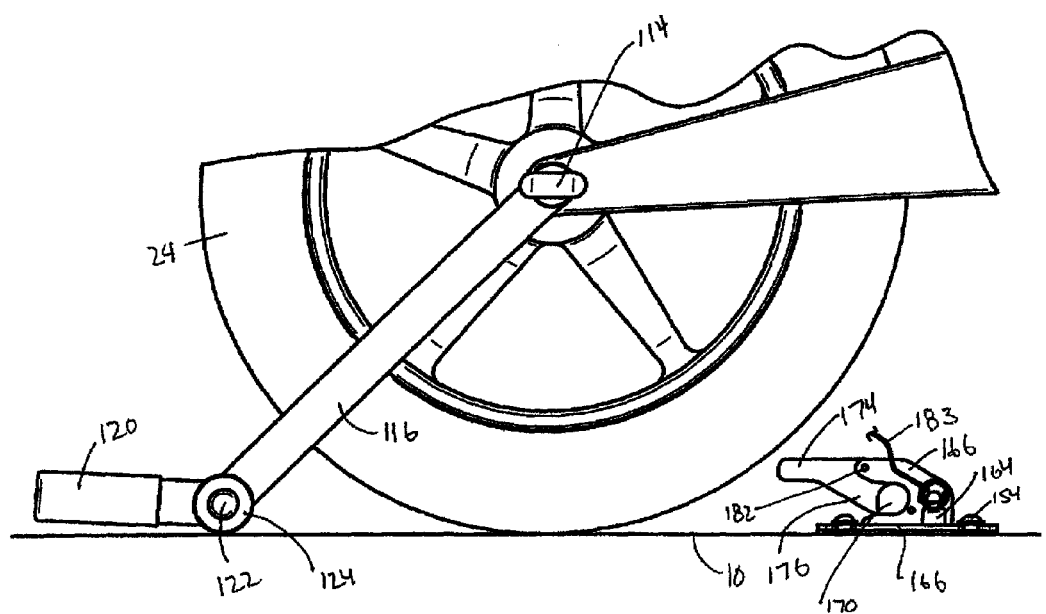
FIG. 5 is a side view showing the framework assembly mated to the motorcycle prior to the framework assembly being captured by the receiver assembly.
Figure 6:
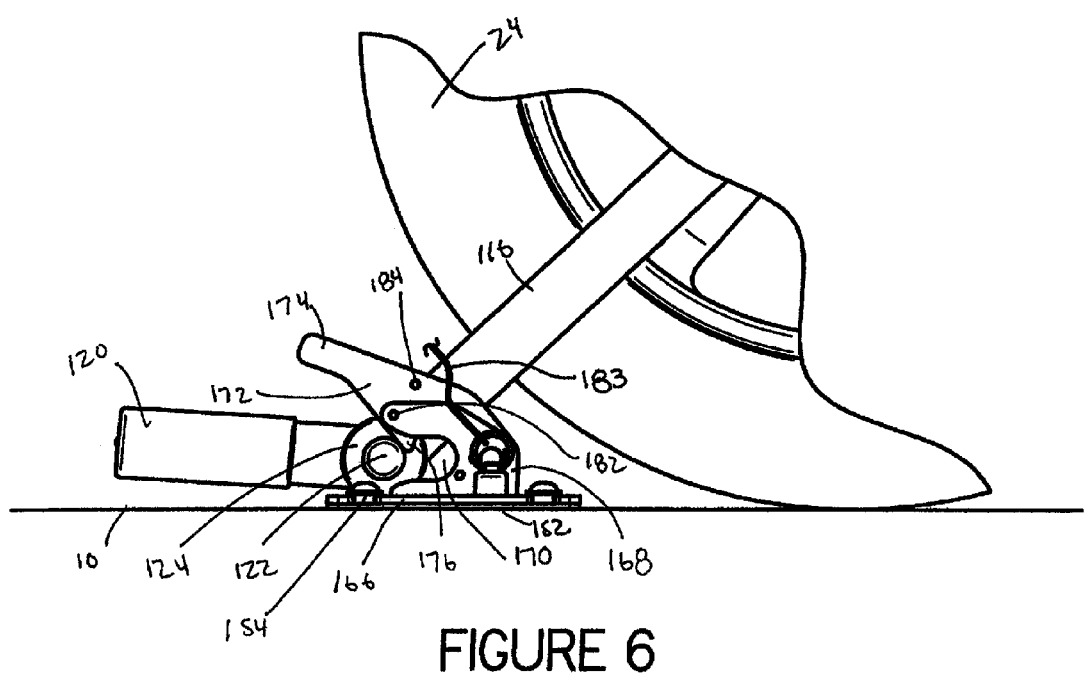
FIG. 6 is a side view showing the trailing bar of the framework assembly as it is being captured by the receiver assembly.

To operate the restraint system 100, the user normally attaches the framework assembly 110 to the motorcycle 20 by inserting the rod 112 though the aperture 119 on the ends 117 of the arms 116 and through the rear axle 22 of the motorcycle 20 and then securing the rod 112 with a locking knob 114, pin 115, or other secure locking device. This can generally be done while the motorcycle 20 is on its side stand or center stand, or on a maintenance stand. Referring now to FIG. 5, the user then pushes the motorcycle 20 into the transport vehicle with the framework assembly 110 trailing behind the motorcycle 20. The guides 124, which could also be rotatable or wheels, would allow the trailing bar 118 to glide smoothly across the ground without being scratched. When the motorcycle 20 reaches its stowed position, the trailing bar 118 is captured by one or more locking assemblies 160. FIG. 6 shows the latch 172 in the process of capturing the trailing bar 118. Because of the profile of the protruding member 176 defined by the latch, the user does not have to raise the latch 172 in order to secure the trailing bar 118. As the trailing bar 118 moves forward the trailing bar will move the latch 172 upwards and gravity will cause the latch 172 to move downwardly once the trailing bar has moved into the opening 170 defined by the U-shaped brackets 168. The user then secures the latch 172 with a safety pin 180 or other secure locking device. There are many combinations of passive and active latches and the intent of this invention should not be limited to the preferred embodiment.

Figure 7:
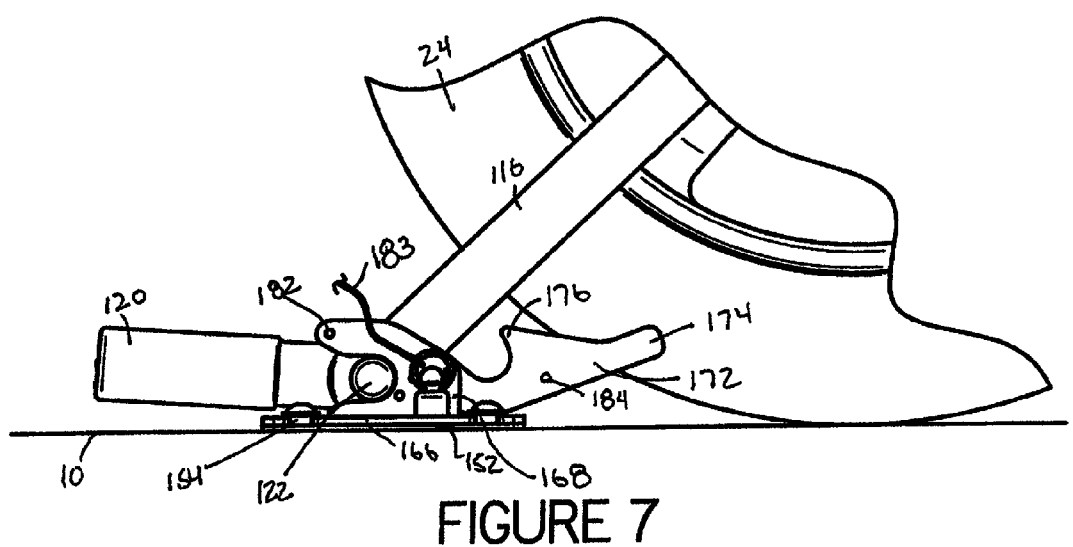
FIG. 7 is a side view showing a latch defined by the receiver assembly rotated to allow the framework assembly and motorcycle to be de-mated from the receiver assembly.

To remove the motorcycle 20 from the restraint system 100, the user generally releases the safety pin 180 and rotates the latch 172 to disengage the trailing bar 118 as shown in FIG. 7. The motorcycle 20 and framework assembly 110 are backed out of the receiver assembly 150. The knob 114 is then removed from the rod 112 such that the rod 112 may be removed from the rear axle, de-mating the framework assembly 110 from the motorcycle.

For convenience, a strap or bungee cord 190 can be stowed on the framework assembly 110 between the two arms 116. The strap can be connected at one end to the rear of the motorcycle 20. This will hold the trailing end of the framework assembly 120 off the ground while the user is pushing the motorcycle.

In addition, the rod 112 inserted through the motorcycle rear axle 22 and framework assembly 110 is free to rotate, forming a hinge joint. The trailing bar 118 is likewise captured by the receiver assembly 150 in a way that is free to rotate, also forming a hinge joint. The combination of the two hinge joints described provides a passive means of accommodating varying heights of motorcycle rear axles that can vary based on the diameter of the motorcycle wheel and/or tire and the amount of air pressure in the motorcycle tire.

The primary configuration for the present invention is for the motorcycle 20 to face forward in the transport vehicle (i.e., motorcycle moving in the same direction as the transport vehicle) with the framework assembly 110 of the restraint system 100 trailing behind it and the motorcycle pushed forward into the back of the transport vehicle by the user. Due to space constraints, transport vehicle configuration, loading procedures or personal preference, it might be desirable to configure the motorcycle in configurations involving combinations of the following: i) motorcycle pushed into transport vehicle forward vs. backward; ii) motorcycle facing frontward vs. backward vs. perpendicular vs. diagonal with respect to travel of transport vehicle; iii) restraint system framework trailing vs. leading motorcycle; and iv) restraint system framework attached to motorcycle rear axle vs. front axle vs. any other structurally sound feature such as an engine mount, foot peg, or suspension pivot bolt.

The preferred embodiment of the rod 112 is to be one-piece and insert completely through the rear axle 22 of the motorcycle. Due to varying configurations of motorcycles, the following methods might also be necessary: i) two separate rods, or pins, inserted through the framework assembly on each side and partially penetrate the motorcycle axle on each side; or ii) two separate cups inserted through the framework assembly on each side and a hex nut, or similar feature on the end of the axle on each side.

The motorcycle, when restrained by the present invention, is restrained in the yaw 200, pitch 210, and roll 220 rotational axes and the x 225, y 215, and z 205 translational axes. Yaw, roll, forward x and y motion is limited by the rigidity of the restraint system 100. Forward pitch and downward z motion is limited by the floor of the transport vehicle. Backward pitch and backward x and upward z motion are limited by the weight of the motorcycle 20 and the handle 120 attached to the trailing bar 118. The handle 120 will prevent this upward and backward motion of the motorcycle 20 (or flipping motion about the rear motorcycle wheel 24) because as the motorcycle 20 begins to flip, the handle 120 will move downwardly striking the floor 10 of the transport vehicle. As soon as the handle 120 strikes the floor 10 the flipping motion of the motorcycle will stop. Given the small distance between the handle 120 and the floor 10, the rear end of the motorcycle 20 will not be able to flip or move much off the ground if at all.

Additional uses of the invention include the following: i) restraining a motorcycle to any relatively flat, horizontal surfaces for purposes such as maintenance or storage, and ii) without the base plate or receiver assemblies, a strap or bungee cord can be stretched between the framework assembly and some point on the motorcycle to hold the motorcycle upright.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A restraint system for use with a motorcycle in a transport vehicle having a floor, wherein the motorcycle has a rear wheel positioned on a rear axle, the restraint system comprising:

a framework assembly having a rod for insertion through the rear axle of the motorcycle, the rod having ends captured by openings defined on ends of a pair of arms, the pair of arms further having second ends permanently attached to a trailing bar such that the arms extend outwardly from the trailing bar, the trailing bar having a pair of rotatable guide wheels capable of rolling across a surface, the framework assembly being positioned such that the trailing bar is behind the rear wheel; and a receiver assembly having a base plate attached to the floor of the transport vehicle, a pair of locking assemblies secured about ends of the base plate, each locking assembly capable of moving to an open position to receive the trailing bar of the framework assembly and then capable of moving to a closed position thereby securing the motorcycle to the floor of the transport vehicle.

2. The system of claim 1, wherein the framework assembly includes a handle extending outwardly from the trailing bar.

3. The system of claim 1, wherein the framework assembly includes locking pins positioned on ends of the rod that extend past the arms.

4. The system of claim 1, wherein the arms defined by the framework assembly are separately spaced by a predetermined distance to accommodate for the rear wheel of the motorcycle.

5. The system of claim 1, wherein each locking assembly includes a latch positioned between a pair of brackets that defines a lateral opening through the brackets and latch, the lateral opening being positioned for receiving and securing an end of the trailing bar between the brackets and latch, whereby the motorcycle is secured to the floor of the transport vehicle through the framework assembly and receiver assembly.

6. The system of claim 5 further comprising a pin for insertion through holes defined by the latch and pair of brackets that align at least when the trailing bar is positioned in the lateral opening.

7. The system of claim 1 further comprising a first hinge joint defined by the rod being rotatably secured within the rear axle and ends of the arms, and a second hinge joint defined by the trailing bar being rotatably secured to the receiver assembly, wherein the first and second hinge joints allow the system to automatically angle to adjust to various motorcycle heights.

\* \* \* \* \*